(12) United States Patent
Kimura et al.

(10) Patent No.: US 7,422,642 B2
(45) Date of Patent: Sep. 9, 2008

(54) METHOD FOR PREPARING CHEMICAL ADSORPTION FILM AND SOLUTION FOR PREPARING CHEMICAL ADSORPTION FILM USED IN THE METHOD

(75) Inventors: Nobuo Kimura, Naka-gun (JP); Yoshitaka Fujita, Ichihara (JP); Norifumi Nakamoto, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 602 days.

(21) Appl. No.: 10/507,658

(22) PCT Filed: Mar. 12, 2003

(86) PCT No.: PCT/JP03/02902

§ 371 (c)(1),
(2), (4) Date: Sep. 9, 2004

(87) PCT Pub. No.: WO03/076064

PCT Pub. Date: Sep. 18, 2003

(65) Prior Publication Data

US 2005/0167004 A1   Aug. 4, 2005

(30) Foreign Application Priority Data

Mar. 12, 2002 (JP) .............................. 2002-066509
Jan. 22, 2003 (JP) .............................. 2003-013559

(51) Int. Cl.
 *C23C 22/00* (2006.01)
(52) U.S. Cl. ........................ 148/243; 424/428; 206/2
(58) Field of Classification Search ................ 148/243, 148/249, 428; 106/2; 428/428
See application file for complete search history.

(56) References Cited

U.S. PATENT DOCUMENTS 4,525,425 A * 6/1985 Church .................. 428/428
5,250,322 A   10/1993 Takahashi et al.
5,489,328 A   2/1996 Ono et al.

FOREIGN PATENT DOCUMENTS

| EP | 548775 A1 | 6/1993 |
|---|---|---|
| EP | 661558 A1 | 7/1995 |
| EP | 665277 A2 | 8/1995 |
| EP | 887394 A1 | 12/1998 |
| EP | 1113064 A1 | 7/2001 |
| JP | 4-132637 | 5/1992 |
| JP | 4-221630 | 8/1992 |
| JP | 4-367721 | 12/1992 |
| JP | 5-171111 A | 7/1993 |
| JP | 8-012375 A | 1/1996 |
| JP | 8-337654 | 12/1996 |
| JP | 9-208438 | 8/1997 |
| JP | 9-278490 A | 10/1997 |
| JP | 2000-053421 | 2/2000 |

OTHER PUBLICATIONS

Patent Abstracts of Japan for JP04-132637 published on May 6, 1992.
Patent Abstracts of Japan for JP04-221630 published on Aug. 12, 1992.
Patent Abstracts of Japan for JP04-367721 published on Dec. 21, 1992.
Patent Abstracts of Japan for JP08-337654 published on Dec. 24, 1996.
Patent Abstracts of Japan for JP09-208438 published on Aug. 12, 1997.
Patent Abstracts of Japan for JP2000-053421 published on Feb. 22, 2000.
Certified translation of Japanese Patent Publication No. 08-012375 (Previously Cited in this application).

* cited by examiner

*Primary Examiner*—Roy King
*Assistant Examiner*—Weiping Zhu
(74) *Attorney, Agent, or Firm*—Darby & Darby P.C.

(57) ABSTRACT

To provide a method which allows the combination of rapid formation of a chemical adsorption film with the preparation of the film which is reduced in the content of impurities and having a dense structure. A method for preparing a chemical adsorption film on the surface of a substrate containing an active hydrogen, characterized in that it includes treating a metal based surfactant having at least one hydrolyzable group with a metal oxide or a partially hydrolyzed product from a metal alkoxide and water in an organic solvent to form a solution, and contacting the solution with the surface of the substrate.

12 Claims, No Drawings

METHOD FOR PREPARING CHEMICAL ADSORPTION FILM AND SOLUTION FOR PREPARING CHEMICAL ADSORPTION FILM USED IN THE METHOD

Cross-Reference to Prior Application

This is a U.S. national phase application under 35 U.S.C. § 371 of International Patent Application No. PCT/JP03/02902 filed Mar. 12, 2003, and claims the benefit of Japanese Patent Application Nos. 2002-066509 filed Mar. 12, 2002 and 2003-013559 filed Jan. 22, 2003 which are incorporated by reference herein. The International Application was published in Japanese on Sep. 18, 2003 as WO 03/076064 A1 under PCT Article 21(2).

1. Technical Field

The present invention relates to a method for preparing a chemical adsorption film on a substrate which contains active hydrogen on the surface thereof, via metal-oxygen bonding, and a chemical adsorption solution used in the method.

2. Background Art

Methods for preparing a chemical adsorption monomolecular film having excellent peeling resistance, no pin holes, and film thickness on the nanometer order, i.e., a film having excellent transparency which does not deteriorate the glossiness of a surface of a substrate or the transparency of a substrate are known (refer to Japanese Laid-Open Patent Application, No. Hei 4-132637, Japanese Laid-Open Patent Application, No. Hei 4-221630, and Japanese Laid-Open Patent Application, No. Hei 4-367721).

However, these conventional methods for preparing a chemical adsorption monomolecular film have a significant problem that a harmful hydrochlorinated gas is generated during the preparation of a film since the film is formed by utilizing a dehydrochlorinating reaction between a chlorosilane based surfactant and active hydrogen present on the surface of a substrate. Also, although attempts have been made to form a molecular film by subjecting an alkoxysilane surfactant to a dealcoholization reaction, there is a problem that the formation of a film cannot be carried out easily since the reaction rate thereof is slow. Moreover, although use of a dealcoholization catalyst may be conceived of, there is a problem in that, if the dealcoholization catalyst is simply added, a surfactant is self-crosslinked due to moisture contained in the surrounding air and the surfactant is deactivated. That is, if water is contained in a surface treatment agent, a surfactant is self-crosslinked before it is reacted with the surface of a substrate, and hence the reaction at a solid-liquid interface on the surface of a substrate is inhibited and the formation of a chemical adsorption film becomes difficult.

In order to solve the above-mentioned problems in the methods of forming a chemical adsorption film on the surface of a substrate containing active hydrogen, a method is known in which a chemical adsorption film covalently bonded to the surface of a substrate via siloxane bondings is formed by contacting a mixed solution containing at least alkoxysilane based surfactant, non-aqueous solvent including no active hydrogen, and silanol condensation catalyst to the surface of the substrate. Examples of the silanol condensation catalyst include at least one substance selected from carboxylic acid metal salt, carboxylic acid ester metal salt, carboxylic acid metal salt polymer, carboxylic acid metal salt chelate, titanic acid ester and titanic acid ester chelate (Japanese Laid-Open Patent Application, No. Hei 8-337654).

DISCLOSURE OF INVENTION

However, even if the above-mentioned method is used, there are problems in that it takes time to form a film and the silanol condensation catalyst remains in the film. If a chemical adsorption is carried out while the above-mentioned condensation catalyst, hydrolysis catalyst, etc., are still present in a solution, a problem is caused in that these catalysts inhibit the adsorption and a monomolecular film having a dense structure cannot be formed. In particular, in a fine patterning for designing an electronic device, etc., a monomolecular film is required which is reduced in the content of impurities and having a dense structure.

Accordingly, an object of the present invention is to provide a method which allows the combination of rapid formation of a film with the preparation of a film which is reduced in the content of impurities and having a dense structure.

The inventors of the present invention, by conducting diligent studies to solve the above-mentioned problems, found that a chemical adsorption film can be rapidly formed by treating a metal based surfactant having at least one hydrolyzable group, in an organic solvent, with a metal oxide or a partially hydrolyzed product from a metal alkoxide and water, and that the metal oxide and the partially hydrolyzed product from the metal alkoxide used can be removed by a simple operation, such as filtration, and completed the invention.

That is, the present invention relates to:

(1) a method for preparing chemical adsorption film on a surface of a substrate containing active hydrogen including the steps of treating a metal based surfactant having at least one hydrolyzable group with a metal oxide or a partially hydrolyzed product from a metal alkoxide and water in an organic solvent to form a solution, and contacting the solution with the surface of the substrate;

(2) a method for preparing a chemical adsorption film on a surface of a substrate containing active hydrogen, including the steps of: treating a metal based surfactant having at least one hydrolyzable group with a metal oxide or a partially hydrolyzed product from a metal alkoxide and water in an organic solvent to form a solution; removing the metal oxide or the partially hydrolyzed product from a metal alkoxide, and contacting the solution with the surface of the substrate;

(3) a method for preparing a chemical adsorption film according to (1) or (2), wherein an amount of the metal oxide used is a catalytic amount with respect to the metal based surfactant;

(4) a method for preparing a chemical adsorption film according to any one of (1)-(3), wherein the chemical adsorption film is a chemical adsorption film which is covalently bonded to the surface of the substrate via metal-oxygen bonding;

(5) a method for preparing a chemical adsorption film according to any one of (1)-(4), wherein the chemical adsorption film is a monomolecular film;

(6) a method for preparing a chemical adsorption film according to any one of (1)-(5), wherein the organic solvent is a hydrocarbon solvent or a fluorocarbon solvent;

(7) a method for preparing a chemical adsorption film according to any one of (1)-(6), wherein the partially hydrolyzed product from a metal alkoxide has a property of stably dispersing without being agglomerated in an organic solvent in the absence of acid, base, and/or dispersion stabilizer;

(8) a method for preparing a chemical adsorption film according to any one of (1)-(7), wherein the partially hydrolyzed product from a metal alkoxide is a product obtained by hydrolysis using 0.5 to less than 2.0 times water on a molar basis with respect to the metal alkoxide in an organic solvent in the absence of acid, base, and/or dispersion stabilizer in a temperature range of −100° C. to a reflux temperature of the organic solvent;

(9) a method for preparing a chemical adsorption film according to any one of (1)-(8), wherein metals present in the metal oxide or the partially hydrolyzed product from a metal alkoxide is at least one kind of metal selected from the group consisting of titanium, zirconium, aluminum, silicon, germanium, indium, tin, tantalum, zinc, tungsten, and lead;

(10) a method for preparing a chemical adsorption film according to any one of (1)-(9), wherein the metal based surfactant having at least one hydrolyzable group is a compound expressed by the following formula (I):

$$R^1{}_n MX_{m-n} \quad (I)$$

wherein $R^1$ represents a monovalent hydrocarbon group, a monovalent halogenated hydrocarbon group, a monovalent hydrocarbon group having a coupling group, or a monovalent halogenated hydrocarbon group having a coupling group; M represents at least one kind of metal atom selected from the group consisting of silicon atom, germanium atom, tin atom, titanium atom, and zirconium atom; X represents a hydrolyzable group; n represents an integer from 1 to (m−1), and m represents a valence of M, and when n is 2 or greater, $R^1$ may be the same or different from each other, and when (m−2) is 2 or greater, X may be the same or different from each other;

(11) a method for preparing a chemical adsorption film according to (10), wherein the compound expressed by the formula (I) is a compound expressed by the following formula (II):

$$CF_3-(CF_2)_p-R^2{}_q-MY_rX_{m-r} \quad (II)$$

wherein $R^2$ represents an alkylene group, a vinylene group, an ethynylene group, an arylene group, or a divalent functional group including a silicon atom and/or oxygen atom; Y represents a hydrogen atom, an alkyl group, an alkoxy group, an alkyl group including fluorine, or an alkoxy group including fluorine; each of X, M, and m are the same as in (10); p represents 0 or any integer; q represents 0 or 1, and r represents 0 or an integer of 1 to (m−1), and when r is 2 or greater, Y may be the same or different from each other, and when m−r is 2 or greater, X may be the same or different from each other;

(12) a method for preparing a chemical adsorption film according to any one of (1)-(11), wherein the substrate is at least one selected from metal, ceramic, glass, plastic, paper, fiber, and leather, and

(13) a method for preparing a chemical adsorption film according to any one of (1)-(12), wherein the step of treating a metal based surfactant having at least one hydrolyzable group with a metal oxide or a partially hydrolyzed product from a metal alkoxide and water in an organic solvent, is a hydrolysis process.

Also the present invention relates to:

(14) a solution for preparing a chemical adsorption film produced by a method including the step of: treating a metal based surfactant having at least one hydrolyzable group with a metal oxide or a partially hydrolyzed product from a metal alkoxide and water in an organic solvent;

(15) a solution for preparing a chemical adsorption film produced by a method including the steps of: treating a metal based surfactant having at least one hydrolyzable group with a metal oxide or a partially hydrolyzed product from a metal alkoxide and water in an organic solvent, and removing the metal oxide or the partially hydrolyzed product from a metal alkoxide;

(16) a solution for preparing a chemical adsorption film according to (14) or (15), wherein an amount of the metal oxide used is a catalytic amount with respect to the metal based surfactant;

(17) a solution for preparing a chemical adsorption film according to any one of (14)-(16), wherein the chemical adsorption film is a chemical adsorption film which is covalently bonded to the surface of the substrate via metal-oxygen bonding;

(18) a solution for preparing a chemical adsorption film according to any one of (14)-(17), wherein the chemical adsorption film is a monomolecular film;

(19) a solution for preparing a chemical adsorption film according to any one of (14)-(18), wherein the organic solvent is a hydrocarbon solvent or a fluorocarbon solvent;

(20) a solution for preparing a chemical adsorption film according to any one of (14)-(19), wherein the partially hydrolyzed product from a metal alkoxide has a property of stably dispersed without being agglomerated in an organic solvent in the absence of acid, base, and/or dispersion stabilizer;

(21) a solution for preparing a chemical adsorption film according to any one of (14)-(20), wherein the partially hydrolyzed product from a metal alkoxide is a product obtained by hydrolysis using 0.5 to less than 2.0 times water on a molar basis with respect to the metal alkoxide in an organic solvent in the absence of acid, base, and/or dispersion stabilizer at a temperature range of −100° C. to a reflux temperature of the organic solvent;

(22) a solution for preparing a chemical adsorption film according to any one of (14)-(21), wherein metals present in the metal oxide or the partially hydrolyzed product from a metal alkoxide is at least one kind of metal selected from the group consisting of titanium, zirconium, aluminum, silicon, germanium, indium, tin, tantalum, zinc, tungsten, and lead;

(23) a solution for preparing a chemical adsorption film according to any one of (14)-(21), wherein the metal based surfactant having at least one hydrolyzable group is a compound expressed by the following formula (I):

$$R^1{}_n MX_{m-n} \quad (I)$$

wherein $R^1$ represents a monovalent hydrocarbon group, a monovalent halogenated hydrocarbon group, a monovalent hydrocarbon group having a coupling group, or a monovalent halogenated hydrocarbon group having a coupling group; M represents at least one kind of metal atom selected from the group consisting of silicon atom, germanium atom, tin atom, titanium atom, and zirconium atom; X represents a hydrolyzable group; n represents an integer from 1 to (m−1), and m represents a valence of M, and when n is 2 or greater, $R^1$ may be the same or different from each other, and when (m−2) is 2 or greater, X may be the same or different from each other;

(24) a solution for preparing a chemical adsorption film according to (23), wherein the compound expressed by the formula (I) is a compound expressed by the following formula (II):

$$CF_3-(CF_2)_p-R^2{}_q-MY_rX_{m-r} \quad (II)$$

wherein $R^2$ represents an alkylene group, a vinylene group, an ethynylene group, an arylene group, or a divalent functional group including a silicon atom and/or oxygen atom; Y represents a hydrogen atom, an alkyl group, or an alkyl group including fluorine; each of X, M, and m are the same as in (23); p represents 0 or any integer; q represents 0 or 1, and r represents 0 or an integer of 1 to (m−1), and when r is 2 or greater, Y may be the same or different from each other, and when m−r is 2 or greater, X may be the same or different from each other; and

(25) a solution for preparing a chemical adsorption film according to any one of (14)-(24), wherein the step of treating a metal based surfactant having at least one hydrolyzable group with a metal oxide or a partially hydrolyzed product from a metal alkoxide and water in an organic solvent, is a hydrolysis process.

The metal based surfactant having at least one hydrolyzable group used in the present invention is not particularly limited as long as it has a hydrolyzable functional group which reacts with active hydrogen on a surface of a substrate so that it is bonded to the surface via the functional group, and possesses a hydrophilic portion which may form such bonding and a hydrophobic portion within the same molecule. Preferable examples thereof include the compound expressed by the formula (I).

In the formula (I), $R^1$ indicates a monovalent hydrocarbon group, a monovalent hydrocarbon group having a substituent, a monovalent halogenated hydrocarbon group, a monovalent halogenated hydrocarbon group having a substituent, a monovalent hydrocarbon group having a coupling group, or a monovalent halogenated hydrocarbon group having a coupling group, and when n is 2 or greater, $R^1$ may be the same group or different groups.

When $R^1$ is a monovalent hydrocarbon group, $R^1$ is preferably an alkyl group having a number of carbon atoms of 1-30, an alkenyl group having the number of carbon atoms of 1-30, or an aryl group. When $R^1$ is a monovalent halogenated hydrocarbon group, the group is a group in which at least one hydrogen atom contained in the hydrocarbon group is substituted with a halogen atom, and a group in which at least two hydrogen atoms in an alkyl group are substituted with halogen atoms is preferable. Examples of the halogen atoms include fluorine atom, chlorine atom, bromine atom, etc., and the fluorine atom is preferable.

When $R^1$ is a fluorinated alkyl group, it is preferable that the group have a straight chain structure or a branched structure, and if it has a branched structure, it is preferable that the branched portion be formed of a short chain having a number of carbon atoms of about 1 to 4. Also, a group in which at least one fluorine atom is bonded to a terminal carbon atom is preferable. Moreover, although a group having a —$CF_3$ group portion in which three fluorine atoms are bonded to a terminal carbon atom is particularly preferable, the group may be a carbon chain in which the terminal thereof is a hydrocarbon group not substituted with fluorine atoms and an intermediate carbon chain has substituted fluorine atom(s) instead.

Also, the number of fluorine atoms in the fluorinated alkyl group, when it is expressed by (the number of fluorine atoms in a fluorinated alkyl group)/(the number of hydrogen atoms present in an alkyl group having the same number of carbon atoms corresponding to the fluorinated alkyl group)×100%, is preferably 60% or greater, and more preferably 80% or greater. Moreover, a group having a terminal portion of perfluoroalkyl portion in which all of the hydrogen atoms in the alkyl group thereof are substituted with fluorine atoms, and having an intervening group of —$(CH_2)_h$— where h is an integer of 1 to 6, preferably 2 to 4, between a metal atom is preferable. The same is also applied when $R^1$ is a monovalent halogenated hydrocarbon group having a substituent or a coupling group.

When $R^1$ is a monovalent hydrocarbon group having a substituent, the group is a group in which hydrogen atoms in the monovalent hydrocarbon group are substituted with substituents, and when $R^1$ is a monovalent halogenated hydrocarbon group having a substituent, the group is a group in which some of the hydrogen atoms or halogen atoms in the monovalent halogenated hydrocarbon group is substituted with substituents. Examples of the substituents which may be present in the above groups include a carboxylic group, an amide group, an imide group, an ester group, an alkoxy group, a hydroxyl group, and so forth. Also, the number of substituents in these groups is preferably 1 to 3.

Moreover, when $R^1$ is a monovalent hydrocarbon group having a coupling group or a monovalent halogenated hydrocarbon group having a coupling group, examples thereof include a group in which a coupling group is contained between a carbon-carbon bonding of the monovalent hydrocarbon group or the monovalent halogenated hydrocarbon group, and a group in which a coupling group is bonded to a terminal of the monovalent hydrocarbon group or the monovalent halogenated hydrocarbon group, which is bonded to a metal atom. Preferable examples of the coupling group include —O—, —S—, —COO—, and —$CONR^{21}$ where $R^{21}$ is a hydrogen atom or an alkyl group.

Among them, from the viewpoints of water-repellency and durability, $R^1$ is preferably a long chain alkyl group, a fluorinated alkyl group, or a fluorinated alkyl group having a coupling group. When $R^1$ is a fluorinated alkyl group or a fluorinated alkyl group having a coupling group, preferable examples thereof include the following groups:

$CF_3$—
$CF_3CF_2$—
$(CF_3)_2CF$—
$(CF_3)_3C$—
$CF_3(CH_2)_2$—
$CF_3(CF_2)_3(CH_2)_2$—
$CF_3(CF_2)_5(CH_2)_2$—
$CF_3(CF_2)_7(CH_2)_2$—
$CF_3(CF_2)_3(CH_2)_3$—
$CF_3(CF_2)_5(CH_2)_3$—
$CF_3(CF_2)_7(CH_2)_3$—
$CF_3(CF_2)_4O(CF_2)_2(CH_2)_2$—
$CF_3(CF_2)_4O(CF_2)_2(CH_2)_3$—
$CF_3(CF_2)_7O(CF_2)_2(CH_2)_2$—
$CF_3(CF_2)_7CONH(CH_2)_2$—
$CF_3(CF_2)_7CONH(CH_2)_3$—
$CF_3(CF_2)_3O[CF(CF_3)CF(CF_3)O]_2CF(CF_3)CO$—$NH(CH_2)_3$—
$CH_3(CF_2)_7(CH_2)_2$—
$CH_3(CF_2)_8(CH_2)_2$—
$CH_3(CF_2)_9(CH_2)_2$—
$CH_3(CF_2)_{10}(CH_2)_2$—
$CH_3(CF_2)_{11}(CH_2)_2$—
$CH_3(CF_2)_{12}(CH_2)_2$—
$CH_3(CF_2)_7(CH_2)_3$—
$CH_3(CF_2)_9(CH_2)_3$—
$CH_3(CF_2)_{11}(CH_2)_3$—
$CH_3CH_2(CF_2)_6(CH_2)_2$—
$CH_3CH_2(CF_2)_8(CH_2)_2$—
$CH_3CH_2(CF_2)_{10}(CH_2)_2$—
$CH_3(CF_2)_4O(CF_2)_2(CH_2)_2$—
$CH_3(CF_2)_7(CH_2)_2O(CH_2)_3$—
$CH_3(CF_2)_8(CH_2)_2O(CH_2)_3$—
$CH_3(CF_2)_9(CH_2)_2O(CH_2)_3$—
$CH_3CH_2(CF_2)_6(CH_2)_2O(CH_2)_3$—
$CH_3(CF_2)_6CONH(CH_2)_3$—

CH$_3$(CF$_2$)$_8$CONH(CH$_2$)$_3$—
CH$_3$(CF$_2$)$_3$O[CF(CF$_3$)CF(CF$_3$)O]$_2$CF(CF$_3$)CO—NH(CH$_2$)$_m$—

X in the formula (I) indicates a hydrolyzable group, and examples thereof include a hydroxyl group, an alkoxy group having a number of carbon atoms of 1 to 6, an acyloxy group having a number of carbon atoms of 1 to 6, a halogen atom, an isocyanate group, a cyano group, an amino group, and an amide group. When (m−n) is 2 or greater, X may be the same group or different groups. In particular, a hydroxyl group, an alkoxy group having a number of carbon atoms of 1 to 6 which may include a substituent, a halogen atom, and an isocyanate group are preferable.

Also, n in the formula (I) indicates an integer of 1 to (m−1), and n is preferably 1 in order to produce a chemical adsorption film of high density. M indicates an atom selected from the group of silicon atom, germanium atom, tin atom, titanium atom, and zirconium atom, and from the viewpoints of availability and reactivity, M is preferably a silicon atom.

Among the compounds expressed by the formula (I), preferable examples thereof include compounds expressed by the formula (II). In the formula (II), R$^2$ indicates an alkylene group, a vinylene group, an ethynylene group, an arylene group, or a divalent functional group including a silicon atom and/or oxygen atom. Specific examples thereof include functional groups expressed by the following formulae:

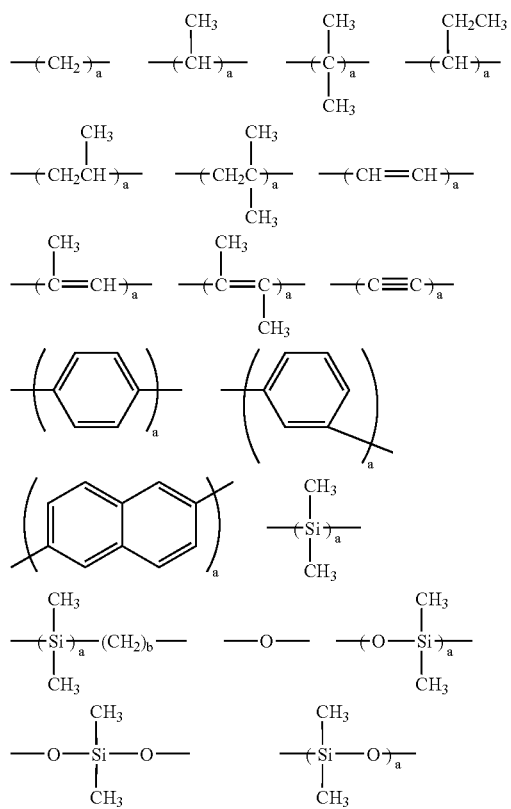

where each of a and b in the formulae indicates an arbitrary integer of 1 or greater.

In the formula (II), Y indicates a hydrogen atom, an alkyl group, an alkoxy group, an alkyl group including fluorine, or an alkoxy group including fluorine. Also, although r indicates 0 or an integer of 1 to (m−1), r is preferably 0 in order to prepare an adsorption film of high density. Examples of the compounds expressed by the formula (I), other than the compounds expressed by the formula (II), include the following compounds:

(1) CH$_3$—(CH$_2$)$_g$—MY$_r$X$_{m-r}$
(2) CH$_3$—(CH$_2$)$_s$—O—(CH$_2$)$_t$—MY$_r$X$_{m-r}$
(3) CH$_3$—(CH$_2$)$_u$—Si(CH$_3$)$_2$—(CH$_2$)$_v$—MY$_r$X$_{m-r}$
(4) CF$_3$COO—(CH$_2$)$_w$—MY$_r$X$_{m-r}$

In the above formulae, each of g, s, u, v, and w indicates an arbitrary integer, and a preferable range thereof is 1-25 for g, 0-12 for s, 1-20 for t, 0-12 for u, 1-20 for v, and 1-25 for w. Also, Y, X, r and m have the same meaning as those in the formula (II).

Examples of the compounds expressed by the formula (I) include compounds expressed by the following formulae in which a silicon atom represents a metal atom. Note that the hydrolyzable group is also not limited to those shown in the examples and other hydrolyzable groups may be used in the same manner CH$_3$CH$_2$O(CH$_2$)$_{15}$Si(OCH$_3$)$_3$
CF$_3$CH$_2$O(CH$_2$)$_{15}$Si(OCH$_3$)$_3$
CH$_3$(CH$_2$)$_2$Si(CH$_3$)$_2$(CH$_2$)$_{15}$Si(OCH$_3$)$_3$
CH$_3$(CH$_2$)$_6$Si(CH$_3$)$_2$(CH$_2$)$_9$Si(OCH$_3$)$_3$
CH$_3$COO(CH$_2$)$_{15}$Si(OCH$_3$)$_3$
CF$_3$(CF$_2$)$_5$(CH$_2$)$_2$Si(OCH$_3$)$_3$
CF$_3$(CF$_2$)$_7$—(CH=CH)$_3$—Si(OCH$_3$)$_3$
CH$_3$CH2O(CH$_2$)$_{15}$Si(OC$_2$H$_5$)$_3$
CH$_3$(CH$_2$)$_2$Si(CH$_3$)$_2$(CH$_2$)$_{15}$Si(OC$_2$H$_5$)$_3$
CH$_3$(CH$_2$)$_6$Si(CH$_3$)$_2$(CH$_2$)$_9$Si(OC$_2$H$_5$)$_3$
CF$_3$(CH$_2$)$_6$Si(CH$_3$)$_2$(CH$_2$)$_9$Si(OC$_2$H$_5$)$_3$
CH$_3$COO(CH$_2$)$_{15}$Si(OC$_2$H$_5$)$_3$
CF$_3$COO(CH$_2$)$_{15}$Si(OC$_2$H$_5$)$_3$
CF$_3$COO(CH$_2$)$_{15}$Si(OCH$_3$)$_3$
CF$_3$(CF$_2$)$_9$(CH$_2$)$_2$Si(OC$_2$H$_5$)$_3$
CF$_3$(CF$_2$)$_7$(CH$_2$)$_2$Si(OC$_2$H$_5$)$_3$
CF$_3$(CF$_2$)$_5$(CH$_2$)$_2$Si(OC$_2$H$_5$)$_3$
CF$_3$(CF$_2$)$_7$(CH=CH)$_3$Si(OC$_2$H$_5$)$_3$
CF$_3$(CF$_2$)$_9$(CH$_2$)$_2$Si(OCH$_3$)$_3$
CF$_3$(CF$_2$)$_5$(CH$_2$)$_2$Si(OCH$_3$)$_3$
CF$_3$(CF$_2$)$_7$(CH$_2$)$_2$Si(CH$_3$)(OC$_2$H$_5$)$_2$
CF$_3$(CF$_2$)$_7$(CH$_2$)$_2$Si(CH$_3$)(OCH$_3$)$_2$
CF$_3$(CF$_2$)$_7$(CH$_2$)$_2$Si(CH$_3$)$_2$(OC$_2$H$_5$)
CF$_3$(CF$_2$)$_7$(CH$_2$)$_2$Si(CH$_3$)$_2$(OCH$_3$)
CF$_3$(CH$_2$)$_2$SiCl$_3$
CF$_3$(CF$_2$)$_3$(CH$_2$)$_2$SiCl$_3$
CF$_3$(CF$_2$)$_5$(CH$_2$)$_2$SiCl$_3$
CF$_3$(CF$_2$)$_7$(CH$_2$)$_2$SiCl$_3$
CF$_3$(CF$_2$)$_3$(CH$_2$)$_3$SiCl$_3$
CF$_3$(CF$_2$)$_5$(CH$_2$)$_3$SiCl$_3$
CF$_3$(CF$_2$)$_7$(CH$_2$)$_3$SiCl$_3$
CF$_3$(CF$_2$)$_4$O(CF$_2$)$_2$(CH$_2$)$_2$SiCl$_3$
CF$_3$(CF$_2$)$_4$O(CF$_2$)$_2$(CH$_2$)$_3$SiCl$_3$
CF$_3$(CF$_2$)$_7$(CH$_2$)$_2$O(CH$_2$)$_3$SiCl$_3$
CF$_3$(CF$_2$)$_7$CONH(CH$_2$)$_3$SiCl$_3$
CF$_3$(CF$_2$)$_7$CONH(CH$_2$)$_3$SiCl$_3$
CF$_3$(CF$_2$)$_3$O[CF(CF$_3$)CF(CF$_3$)O]$_2$CF(CF$_3$)—CONH(CH$_2$)$_3$SiCl$_3$
CF$_3$(CF$_2$)$_3$(CH$_2$)$_2$Si(CH$_3$)Cl$_2$
CF$_3$(CF$_2$)$_5$(CH$_2$)$_2$Si(CH$_3$)Cl$_2$
CF$_3$(CH$_2$)$_2$Si(CH$_3$)Cl$_2$
CF$_3$(CF$_2$)$_3$(CH$_2$)$_3$Si(CH$_3$)Cl$_2$
CF$_3$(CF$_2$)$_5$(CH$_2$)$_3$Si(CH$_3$)Cl$_2$
CF$_3$(CF$_2$)$_7$(CH$_2$)$_3$Si(CH$_3$)Cl$_2$
CF$_3$(CF$_2$)$_4$(CF$_2$)$_2$(CH$_2$)$_2$Si(CH$_3$)Cl$_2$
CF$_3$(CF$_2$)$_4$(CF$_2$)$_2$(CH$_2$)$_3$Si(CH$_3$)Cl$_2$
CF$_3$(CF$_2$)$_4$(CH$_2$)$_2$O(CH$_2$)$_3$Si(CH$_3$)Cl$_2$
CF$_3$(CF$_2$)$_7$CONH(CH$_2$)$_2$Si(CH$_3$)Cl$_2$

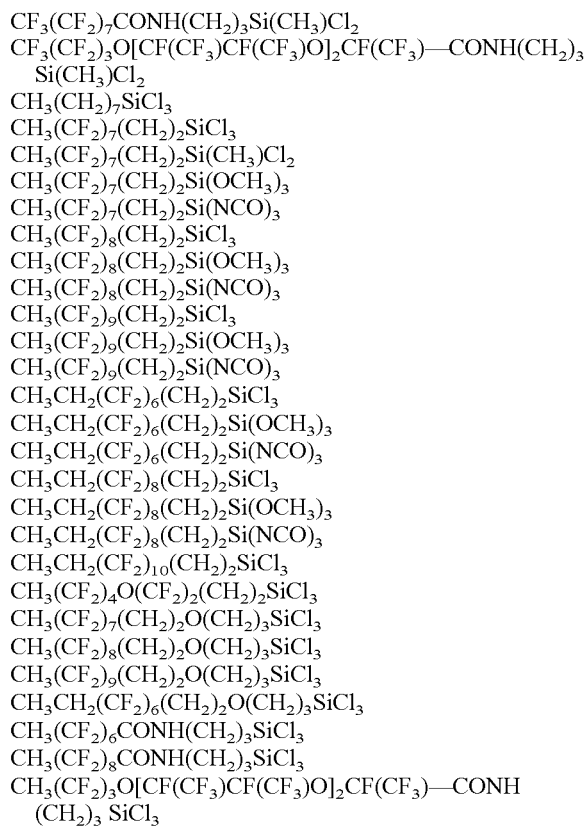

Although the metal oxide used in the present invention is not particularly limited, preferable examples thereof include oxides formed of a metal selected from the group including titanium, zirconium, aluminum, silicon, germanium, indium, tin, tantalum, zinc, tungsten, and lead. The metal oxides may be in the form of sol, gel, and solid. Methods for forming sol or gel are not particularly limited, and in the case of silica sol, examples thereof include a method in which a sodium silicate solution is subjected to a cation exchange process, a method in which silicon alkoxide is subjected to a hydrolysis process, and so forth. In particular, a sol which is stably dispersed in an organic solvent is preferable, and the particle size of the sol is preferably in the range of 10-100 nm, more preferably in the range of 10-20 nm. The shape of the sol is not particularly limited, and it may be in the form of a sphere or ellipsoid.

Specific examples thereof include methanol silica sol, IPA-ST, IPA-ST-UP, IPA-ST-ZL, NPC-ST-30, DMAC-ST, MEK-ST, MIBK-ST, XBA-ST, PMA-ST (all of which are commercial names of organosilica sol produced by Nissan Chemical Industries, Ltd.).

Although the amount of a metal oxide is not particularly limited as long as it does not affect the formation of a chemical adsorption film, it is preferably a catalytic amount with respect to a metal based surfactant. Also, it is preferably 0.001-1 mol, converted to the mole number of the oxide, with respect to 1 mol of a metal based surfactant, and may be used in the range of 0.001-20 mol.

The partially hydrolyzed product from a metal alkoxide used in the present invention is not particularly limited as long as it is present in the state of an oligomer which is a state prior to becoming a high order structure obtained when the metal alkoxide is completely hydrolyzed.

Specific preferable examples thereof include a dispersoid having a property of being non-aggregated and stably dispersed in an organic solvent in the absence of acid, base, and/or dispersion stabilizer.

In the above, the dispersoid means fine particles dispersed in a disperse system, and specific examples thereof include colloidal particle and so forth. Also, the organic solvent is not particularly limited as long as it is capable of dispersing the dispersoid in an organic substance. Specific examples thereof include an alcohol solvent, such as methanol, ethanol, and isopropanol; a chlorine solvent, such as methylene chloride and chloroform; a hydrocarbon solvent, such as hexane, cyclohexane, benzene, toluene, xylene, chlorobenzene; an ether solvent, such as tetrahydrofuran, diethylether, and dioxane; a ketone solvent, such as acetone, methylethyl ketone, and methylisobutyl ketone; an aprotic polar solvent, such as dimethyl formamide, dimethyl sulfoxide, and N-methyl pyrrolidone; and silicone, such as methylpolysiloxane, octa-methylcyclotetrasiloxane, decamethylcyclopentane siloxane, and methylphenylpolysiloxane, which are used in dispersion medium for titanium dioxide dispersoid described in Japanese Laid-Open Patent Application No. Hei 9-208438. As described later, in order to carry out a reaction to be treated with water at a low temperature, it is preferable to use a solvent having a large solubility in water, which does not solidify at a low temperature. Specific preferable examples thereof include a lower alcohol solvent, an ether solvent, and so forth. Also, these solvents may be used singularly or in a mixture of two or more. When these are used as a mixed solvent, a combination of a hydrocarbon solvent, such as toluene and xylene, with a lower alcohol solvent, such as methanol, ethanol, isopropanol, and t-butanol. Moreover, as the lower alcohol solvent, a secondary or greater alcohol solvent, such as isopropanol and t-butanol, is preferable. Although the mixing ratio thereof is not particularly limited, it is preferable to use the hydrocarbon solvent and the lower alcohol solvent within the range of 99/1 to 1/1 in terms of volume ratio.

The above-mentioned acid or base is not particularly limited as long as it functions as a peptizer which redisperses condensed precipitation, as a catalyst for hydrolyzing, dehydrating and condensing a metal alkoxide, etc., to prepare a dispersoid, such as colloidal particle, and as a dispersant for the obtained dispersoid. Specific examples of the acid include mineral acids, such as hydrochloric acid, nitric acid, boric acid, and fluoboric acid; and organic acids, such as acetic acid, formic acid, oxalic acid, carbonic acid, trifluoroacetic acid, p-toluenesulfonic acid, and methane sulfonic acid. In addition, photo-acid forming agents which generate acid by the irradiation of light, more specifically, diphenyl iodonium hexafluoro phosphate, triphenyl phosphonium hexafluoro phosphate and so forth are also examples thereof. Moreover, examples of the base include triethanol amine, triethyl amine, 1,8-diazabicyclo[5,4,0]-7-undecene, ammonium, dimethyl formamide, phosphine and so forth.

Furthermore, the dispersion stabilizer described above means components which are added so as to disperse dispersoid in a disperse medium as stably as possible, and includes condensation inhibitors, etc., such as a peptizer, protective colloide and surfactant. Specific examples of the compounds having such effect include a chelated compound, preferably one having at least one carboxyl group in a molecular structure and exerts strong chelating effect to a metal. Examples of the compounds include polycarbonic acid, such as glycolic acid, gluconic acid, lactic acid, tartaric acid, citric acid, malic acid, and succinic acid; hydroxycarbonic acid, and so forth, and further include pyrophosphoric acid, and tripolyphosphoric acid. Also, examples of polydentate ligand compounds having strong chelate function to a metal atom include acetyl acetone, methyl acetoacetate, acetoacetate-n-propyl, acetoacetate-i-propyl, acetoacetate-n-butyl, acetoacetatesec-butyl, acetoacetate-t-butyl, 2,4-hexane-dione, 2,4-heptane-dione, 3,5-heptane-dione, 2,4-octane-dione, 2,4-nonane-dione, 5-methyl-hexane-dione, and so forth. Moreover, other than the above, examples thereof include, as aliphatic amines, hydrostearic acids, and polyester amines, Sulparse 3000, 9000, 17000, 20000, and 24000 (all of which are products of AstraZeneca International), Disperbyk-161, -162, -163, and -164 (all of which are products of BYK-Chemie), and further include silicone compounds, etc., described in Japanese Laid-Open Patent Application No. hei 9-208438 and Japanese Laid-Open Patent Application No. 2000-53421, such as dimethyl polysiloxane.methyl(polysiloxy alkylene) siloxane copolymer, trimethylsiloxysilic acid, carboxy denatured silicone oil, and amine denatured silicone.

The non-aggregated and stably dispersed state means a state in which dispersoid having a metal-oxygen bonding is not aggregated or inhomogeneously separated in an organic solvent, and the state is preferably a transparent homogeneous state. In this case, the term transparent means a state having high transmittance of visible rays, and more specifically, the state means a state preferably having 80 to 100% transmittance, which is expressed by a spectral transmittance measured under the conditions of the concentration of dispersoid, converted to the oxidant, of 0.5% by weight, the optical path length of quartz cell of 1 cm, using an organic solvent as a subject sample, and the wavelength of light of 550 nm. Also, although the particle size of the dispersoid used in the present invention is not particularly limited, the particle size is preferably within the range of 1 to 100 nm in order to obtain high transmittance of the visible light, more preferably within the range of 1 to 50 nm, and most preferably within the range of 1 to 10 nm.

Specific examples of the metal atom which forms the above-mentioned dispersoid include titanium, zirconium, aluminum, silicon, germanium, indium, tin, tantalum, zinc, tungsten, and lead.

Also, specific examples of metal alkoxide used in the present invention include: silicon alkoxide, such as $Si(OCH_3)_4$, $Si(OC_2H_5)_4$, $Si(OC_3H_7\text{-}i)_4$, and $Si(OC_4H_9\text{-}t)_4$; titanium alkoxide, such as $Ti(OCH_3)_4$, $Ti(OC_2H_5)_4$, $Ti(OC_3H_7\text{-}i)_4$, and $Ti(OC_4H_9)_4$; zirconium alkoxide, such as $Zr(OCH_3)_4$, $Zr(OC_2H_5)_4$, $Zr(OC_3H_7)_4$, and $Zr(OC_4H_9)_4$; aluminum alkoxide, such as $Al(OCH_3)_3$, $Al(OC_2H_5)_3$, $Al(OC_3H_7\text{-}i)_3$ and $Al(OC_4H_9)_3$; germanium alkoxide, such as $Ge(OC_2H_5)_4$; indium alkoxide, such as $In(OCH_3)_3$, $In(OC_2H_5)_3$, $In(OC_3H_7\text{-}i)_3$, and $In(OC_4H_9)_3$; tin alkoxide, such as $Sn(OCH_3)_4$, $Sn(OC_2H_5)_4$, $Sn(OC_3H_7\text{-}i)_4$, and $Sn(OC_4H_9)_4$; tantalum alkoxide, such as $Ta(OCH_3)_5$, $Ta(OC_2H_5)_5$, $Ta(OC_3H_7\text{-}i)_5$, and $Ta(OC_4H_9)_5$; tungsten alkoxide, such as $W(OCH_3)_6$, $W(OC_2H_5)_6$, $W(OC_3H_7\text{-}i)_6$, and $W(OC_4H_9)_6$; zinc alkoxide, such as $Zn(OC_2H_5)_2$; lead alkoxide, such as $Pb(OC_4H_9)_4$, and so forth.

Also, a composite alkoxide obtained by a reaction between the above-mentioned metal alkoxides of different elements, or a composite alkoxide obtained by a reaction between one or more kinds of metal alkoxides and one or more kind of metal salts may be employed. Moreover, these may be used in combination.

Specific examples of the composite alkoxide which is obtained by a reaction between two or more kinds of metal alkoxides include a composite alkoxide which is obtained by a reaction between an alkoxide of an alkali metal or of an alkali earth metal and an alkoxide of a transition metal, and a composite alkoxide which is obtained as a complex salt of combination of 3B group of elements. More specifically, examples thereof include $BaTi(OR)_6$, $SrTi(OR)_6$, $BaZr(OR)_6$, $SrZr(OR)_6$, $LiNb(OR)_6$, $LiTa(OR)_6$, and combinations thereof, $LiVO(OR)_4$, $MgAl_2(OR)_8$, and so forth. Furthermore, examples thereof include reactants with silicon alkoxide, such as, $(RO)_3SiOAl(OR')_2$, $(RO)_3SiOTi(OR')_3$, $(RO)_3 SiOZr(OR')_3$, $(RO)_3SiOB(OR')_2$, $(RO)_3SiONb(OR')_4$, $(RO)_3 SiOTa(OR')_4$ and so forth, and polycondensation products thereof. Here, each of R and R' 1indicates an alkyl group. Also, examples of the composite alkoxides obtained by a reaction between one or more kinds of metal alkoxides and one or more kinds of metallic salts include compounds which are obtained by a reaction between a metallic salt of chloride, nitrate, sulphate, acetate, formate, and oxalate, and an alkoxide.

Although the number of carbon atoms in an alkoxy group of a metal alkoxide is not particularly limited, the number of carbon atoms of 1-4 is preferable from the viewpoints of the concentration of oxide contained, the readiness of elimination of organic compound, and its availability.

Specific examples of the partially hydrolyzed product from a metal alkoxide preferably used in the present invention include a partially hydrolyzed product which is obtained by using water of 0.5 to 2.0 times (in terms of moles) with respect to the above-mentioned metal alkoxide in an organic solvent in the absence of acid, base and/or dispersion stabilizer, and is hydrolyzed within a temperature range of $-100°$ C. to the reflux temperature of an organic solvent.

Also, examples of preferable methods for preparing the partially hydrolyzed product from a metal alkoxide used in the present invention include:

(1) adding water of 0.5 to 1.0 times (in terms of moles) with respect to a metal alkoxide in an organic solvent in the absence of an acid, base, and/or dispersion stabilizer; and (2) adding water of 1.0 to 2.0 times (in terms of moles) with respect to a metal alkoxide in an organic solvent in the absence of an acid, base, and/or dispersion stabilizer at a temperature of $-20°$ C. or less, preferably in the range of $-50$ to $-100°$ C.

Moreover, it is possible to carry out a reaction, after performing a process using the amount of water specified in the above (1) at an arbitrary temperature, by adding water under the temperature condition of $-20°$ C. or less.

Although the kind of water used in the reaction is not particularly limited as long as it is neutral, the water is preferably pure water or distilled water. The amount of water is not particularly limited as long as it is within the range specified above, and may be arbitrary selected based on dispersoid having targeted properties.

Also, although the reaction between the metal alkoxide and water described above (1) may be carried out in an organic solvent, it is possible to directly mix the metal alkoxide with water without using the organic solvent.

Also, although the reaction between a metal alkoxide and water may be carried out using either a method in which water diluted by organic solvent is added to an organic solvent solution of a metal alkoxide or a method in which a metal alkoxide or a diluted solution of an organic solvent is added to an organic solvent in which water is suspended or dissolved, a method in which water is added later is preferable.

Also, although the concentration of a metal alkoxide in organic solvent is not particularly limited as long as it prohibits rapid generation of heat and has fluidity which allows stirring of the solvent, a generally preferable concentration range thereof is within 5-30% by weight.

The reaction temperature of the reaction between a metal alkoxide and water described in (1) above is not particularly limited, and the reaction may be carried out within the temperature range of $-100$ to $100°$ C. The reaction is generally carried out within the temperature range of $-20°$ C. to a boiling temperature of organic solvent used or of alcohol which will be generated by hydrolysis.

The temperature at which water is added in (2) above depends on the stability of a metal alkoxide and is not particularly limited as long as it is −20° C. or less. However, depending on the kind of metal alkoxide, it is preferable to carry out the addition of water to a metal alkoxide at a temperature range of −50° C. to −100° C. It is possible to add water at a low temperature and, after aging for a certain period of time, carry out hydrolysis and a dehydrating condensation reaction within a temperature range of room temperature to a reflux temperature of a solvent used.

Although the amount of the partially hydrolyzed product from a metal alkoxide used is not particularly limited as long as it does not affect the chemical adsorption film to be formed, it is preferable to use catalytic amount with respect to a metal based surfactant, and it is more preferable to use 0.001 to 1 mol, most preferably 0.001 to 0.2 mol, converted to an oxide, with respect to 1 mol of the metal based surfactant.

Specific examples of the organic solvent used for a solution for preparing a chemical adsorption film preferably include hydrocarbon solvent, fluorinated carbon solvent, and silicone solvent, which does not contain water. In particular, one having a boiling point of 100 to 250° C. is readily used. Specific examples thereof include hexane, cyclohexane, benzene, toluene, xylene, petroleum naphtha, solvent naphtha, petroleum ether, petroleum benzene, isoparaffin, normal paraffin, decalin, industrial gasoline, kerosene, ligroin, dimethyl silicone, phenyl silicone, alkyl denatured silicone, polyether silicone, fron solvent, such as $CBr_2ClCF_3$, $CClF_2CF_2CCl_3$, $CClF_2CF_2CHFCl$, $CF_3CF_2CHCl_2$, $CF_3CBrFCBrF_2$, $CClF_2CClFCF_2CCl_3$, $Cl(CF_2CFCl)_2Cl$, $Cl(CF_2CFCl)_2CF_2CCl_3$, and $Cl(CF_2CFCl)_3Cl$, Florinate (a product of 3M Co.), and Aflude (a product of Asahi Glass Co. Ltd.). These may be used singularly of in combination for the cases in which these are miscible with each other.

The method for preparing a solution used for forming a chemical adsorption film according to the present invention may specifically be any of:
(1) a method in which water is added to an organic solvent solution including a metal based surfactant, and a metal oxide and/or a partially hydrolyzed product from a metal alkoxide; and
(2) a method in which a metal oxide and/or a partially hydrolyzed product from a metal alkoxide is added to an organic solvent solution including a metal based surfactant and water.

In order to prohibit a rapid reaction, it is preferable to dilute water to be added and a metal oxide and/or a partially hydrolyzed product from a metal alkoxide with organic solvent and so forth.

The amount of water added is not particularly limited as long as it does not generate problems, such as the metal based surfactant being condensed to each other and the chemical adsorption to a substrate surface is inhibited, the formation of a monomolecular film having a dense structure cannot be formed, and loss in the effective amount of the metal based surfactant, are caused, and may be arbitrary added according to the degree of formation of the chemical adsorption film.

Also, the solution according to the present invention when treated with water may generate precipitates including metal oxides, etc., depending on the metal based surfactant used, and in such a case, it is preferable to remove the precipitates by means of filtration, decanting, and so forth prior to use thereof.

Although the amount of the metal based surfactant contained in the solution for preparing the chemical adsorption film according to the present invention is not particularly limited, it is preferably in the range of 0.1 to 30% by weight in terms of preparing a monomolecular film of dense structure.

Also, the amount of a metal oxide or a partially hydrolyzed product from a metal alkoxide used in a process to be treated with water is preferably within the range of 0.001 to 1.0 mol with respect to 1 mol of the metal based surfactant.

The method for preparing the chemical adsorption film according to the present invention may be used for a preparation of a thin film which is formed by adsorption caused by interaction of some kind via active hydrogen present on the surface of a substrate. In particular, the method is suitable for the preparation of a chemical adsorption film which is covalently bonded to the surface of a substrate via a metal-oxygen bonding. Moreover, the method is suitably used for the case where the adsorption film is a monomolecular film, and where the film is a monomolecular film having a dense structure.

Examples of such substrate are not particularly limited as long as the substrate has active hydrogen of the surface thereof. In particular, a substrate which includes hydroxyl groups (—OH) on the surface thereof is preferable, and examples thereof include a metal, such as Al, Cu and stainless steel, glass, ceramic, paper, natural fiber, leather, and other hydrophilic substrates. Note that if the substrate is a substance which does not include hydroxyl groups on the surface thereof, such as plastics and synthesized fibers, it is preferable to subject the surface thereof in advance to, for example, a process carried out under plasma atmosphere including oxygen at 100 W for about 20 minutes or a corona treatment so that hydrophilic groups may be introduced on the surface thereof. The hydrophilic group is not limited to a hydroxyl group (—OH), and may be a functional group having active hydrogen, such as —COOH, —CHO, =NH, and —$NH_2$. As for polyamide resin or polyurethane resin, of course, no special surface treatment is necessary since imino groups (—NH) are present of the surface thereof, and the active hydrogen of the imino groups (—NH) reacts with alkoxysilyl groups (—SiOA), etc., of the chemical adsorbent film to cause dealcoholization reaction and forms a siloxane bonding (—SiO—).

Also, it is possible to contact at least one compound selected from $SiCl_4$, $SiHCl_3$, $SiH_2Cl_2$, and Cl—$(SiCl_2O)b$-$SiCl_3$ (where b is an integer) with a substrate which does not have active hydrogen on the surface thereof to cause a dehydrochlorination reaction so that a silica base layer having active hydrogen on the surface thereof is formed and used as a substrate of the present invention.

The process used for contacting the solution of preparing a chemical adsorption film according to the present invention with the above-mentioned substrate having active hydrogen on the surface thereof is not particularly limited as long as the solution makes contact with the surface of the substrate. Specific examples of the methods include a dip method, spin coating method, spray method, roller coating method, Mayer bar method, screen printing method, brush coating method, and so forth. Among these, the dip method is particularly preferable.

The temperature at which the solution is contacted the surface of a substrate is not particularly limited as long as the solution has stability at that temperature, and the temperature range may be within the range of a room temperature to a reflux temperature of the solvent used for the solution. The temperature may be adjusted by heating the solution or directly heating the substrate itself. Also, ultrasonic waves may be used in order to facilitate the formation of a film. The process for contacting the surface of a substrate may be performed one time for a longer period of time, or may be carried out for a plurality of times for a shorter period of time.

Also, after the solution is contacted to the surface of a substrate, it is possible to carry out a process for washing the substrate surface in order to remove excessive agent and impurities attached to the surface. By performing the washing process, the thickness of the film may be well controlled. The method of washing is not particularly limited as long as it is capable of removing attached substance on the surface. Specific examples thereof include a method in which a substrate is immersed into solvent which is capable of dissolving a metal based surfactant, a method in which the substrate is left in a vacuum or normal pressure atmosphere so as to vaporize the attached substance, a method in which an inert gas, such as dehumidified nitrogen gas, is applied so as to blow off adhering matter, and so forth.

After the above-mentioned washing process, it is preferable to apply heat to the substrate so that a film formed on the surface of the substrate is stabilized. The heating temperature may be suitably selected based on the substrate and the stability of the film.

BEST MODE FOR CARRYING OUT THE INVENTION

Hereinafter, the present invention will be explained in detail with reference to examples, however, the scope of the present invention is not limited to these examples by any means.

EXAMPLES (1) Preparation of Partially Hydrolyzed Product from Metal Alkoxide-1

After dissolving 12.4 g of titanium tetraisopropoxide (A-1, a product of NIPPON SODA CO., LTD.: purity of 99%, concentration converted to titanium oxide of 28.2% by weight) into 45.0 g of toluene in a four neck flask and subjecting the solution to a nitrogen gas replacement process, it was cooled to −80° C. in an ethanol/liquid nitrogen bath. Apart from this, 1.26 g of ion exchanged water ($H_2O$/Ti=1.6 by molar ratio) was mixed with 11.3 g of isopropanol and cooled to −80 to −70° C. This cooled mixture was added dropwise into the above-mentioned four neck flask while the solution was stirred to carry out a reaction. The temperature of the solution inside the flask was maintained to be −80 to −70° C. during the dropwise addition of the mixture. After the completion of the dropwise addition, the mixture was cooled for 30 minutes while being stirred and then the temperature thereof was increased to a room temperature while being stirred. In this manner, a transparent partially hydrolyzed solution (C-1) having a concentration of 5% by weight converted to titanium oxide was obtained.

(2) Preparation of Partially Hydrolyzed Product from Metal Alkoxide-2

After dissolving 10.8 g of zirconium tetra-n-butoxide (TBZR, a product of NIPPON SODA CO., LTD.: purity of 87%, concentration converted to zirconium oxide of 32.2% by weight) into 46.9 g of toluene solution in a four neck flask and subjecting the solution to a nitrogen gas replacement process, it was cooled to −80° C. in an ethanol/liquid nitrogen bath. Apart from this, 0.812 g of ion exchanged water ($H_2O$/Zr=1.6 by molar ratio) was mixed with 7.30 g of 2-butanol and cooled to −80 to −70° C. This cooled mixture was added dropwise into the above-mentioned four neck flask while the solution was stirred to carry out a reaction. The temperature of the solution inside the flask was maintained to be −80 to −70° C. during the dropwise addition of the mixture. After the completion of the dropwise addition, the mixture was cooled for 30 minutes while being stirred and then the temperature thereof was increased to a room temperature while being stirred. In this manner, a transparent partially hydrolyzed solution (C-2) having a concentration of 5% by weight converted to zirconium oxide was obtained.

(3) Preparation of Partially Hydrolyzed Product from Metal Alkoxide-3

A dispersed solution (C-3) having a concentration of 5% by weight, converted to titanium oxide, in which titanium oxide powder (P-25, a product of NIPPON AEROSIL CO. LTD.) was dispersed in a dehydrated toluene was obtained.

(4) Preparation of Solution for Forming Chemical Adsorption Film

Heptadecatrifluorodecyl trimethoxy silane (FAS-17, a product of Shin-Etsu Chemical Co. Ltd.) was diluted with dehydrated toluene and a 5% by weight solution (F-1) was obtained. The obtained solution (F-1) was added to each of the solutions (C-1), (C-2), and (C-3) at a mixing rate (X) shown in Table 1, and the mixture was stirred for 30 minutes. Then, toluene solution saturated with ion exchanged water was added dropwise to the mixture. After the completion of the dropwise addition, the mixture was stirred for two hours. The amount of the toluene solution saturated with ion exchanged water, which was added dropwise, was adjusted so that the concentration of FAS-17 became 0.5% by weight after the completion of the dropwise addition. Then, the solution was filtered, and a solution for preparing a chemical adsorption film (SA-1 to SA-8) was obtained.

On the other hand, solutions (R-1) and (R-2) in which heptadecatrifluorodecyl silane was diluted with dehydrated toluene or with toluene saturated with ion exchanged water so that the concentration of FAS-17 became 0.5% by weight, were prepared and used as Comparative Examples.

(5) Analysis of Solution for Forming Chemical Adsorption Film

Analysis of each of the solution with respect to Si, Ti, and Zr contained therein was carried out using ICP-AES. Results are shown in Table 1.

TABLE 1

| Solution for preparing chemical adsorption film | Partially hydrolyzed product from metal alkoxide(C) | Mixing rate (X)*1 of F-1 with C | Concentration of metal in the solution (ppm) Si | Concentration of metal in the solution (ppm) Ti or Zr | Si concentration in the solution prior to treatment with water (ppm) |
|---|---|---|---|---|---|
| SA-1 | C-1 | 99:1 | 210 | ND | 246 |
| SA-2 | C-1 | 95:5 | 205 | ND | 246 |
| SA-3 | C-1 | 90:10 | 206 | ND | 246 |
| SA-4 | C-1 | 80:20 | 201 | ND | 246 |
| SA-5 | C-2 | 90:10 | 198 | ND | 246 |
| SA-6 | C-2 | 80:20 | 195 | ND | 246 |
| SA-7 | C-3 | 70:30 | 190 | ND | 246 |
| SA-8 | C-3 | 60:40 | 180 | ND | 246 |

*1X: (mole number of FAS-17 in F-1 solution:mole number of metal components in solution C converted to a metal oxide)
ND: not detected It becomes apparent from the above results that almost all hydrolysis catalyst contained in the solution for preparing a chemical adsorption film can be removed by carrying out only a filtration process.

(6) Formation of Chemical Adsorption Film

Soda lime glass substrates and silicon wafers (Si), which were subjected to an ultrasonic cleaning process and an IPA washing process, were immersed into the above solution for preparing chemical adsorption film (SA-1 to SA-8, R-1 and R-2) for a predetermined period of time shown in Table 3, and then dried at 60° C. for 10 minutes to form chemical adsorption film (SAM-1 to SAM-11, RL-1 and RL-2) of FAS-17.

(7) Evaluation of Chemical Adsorption Film

<Measurement of Contact Angle>

Each of water, toluene (Tol), and isopropyl alcohol (5 μm each) was added dropwise to the surface of each sample using a microsyringe, and after 60 seconds, contact angle thereof was measured using a contact angle measuring device (360S type, a product of Perkin-Elmer Co.).

<Analysis of Composition of Film>

An XPS device (Quantum 2000) (a product of Ulvacphi Inc.) was used for analysis of elements contained in the film.

Results of the above are tabulated in Table 2.

TABLE 2

| Solution for preparing chemical adsorption film | substrate | Immerse time (minute) | Contact angle of film | | | Ratio of element in film |
|---|---|---|---|---|---|---|
| | | | water | Tol | IPA | F/C*[1] |
| SAM-1 | SA-1 | Glass | 30 | 100 | 56 | 36 | 1.69 |
| SAM-2 | SA-2 | Glass | 30 | 103 | 55 | 35 | 1.70 |
| SAM-3 | SA-3 | Glass | 20 | 95 | 48 | 31 | 1.56 |
| SAM-4 | SA-3 | Glass | 30 | 102 | 56 | 37 | 1.70 |
| SAM-5 | SA-3 | Glass | 60 | 105 | 62 | 42 | 1.70 |
| SAM-6 | SA-4 | Si | 30 | 100 | 57 | 40 | 1.70 |
| SAM-7 | SA-4 | Si | 60 | 105 | 60 | 42 | 1.70 |
| SAM-8 | SA-5 | glass | 60 | 100 | 52 | 30 | 1.69 |
| SAM-9 | SA-6 | glass | 60 | 102 | 51 | 35 | 1.70 |
| SAM-10 | SA-7 | glass | 60 | 98 | 58 | 35 | 1.70 |
| SAM-11 | SA-8 | glass | 60 | 102 | 59 | 39 | 1.70 |
| RL-1 | R-1 | glass | 300 | 60 | 28 | 18 | — |
| RL-2 | R-2 | glass | 300 | 73 | 32 | 20 | — |

*[1]Ratio of elements when all alkoxy portions of FAS-17 are hydrolyzed is 1.70

From Table 2, the ratio of elements in the chemical adsorption film obtained in accordance with the methods of the present invention substantially matches the ratio of elements obtained when all alkoxy portions of FAS-17 are hydrolyzed. This indicates that a monomolecular film of FAS-17 was formed on the substrate. Also, the results indicate that properties and characteristics of the films obtained in Examples of the present invention are not affected whether or not the film is subjected to a rinsing process using organic solvent, etc., subjected to a rinsing process as in the Examples, after being immersed in the preparation solution, and it is indicated that a monomolecular film having a dense structure which is self-organized is formed in the preparation solution.

Also, when the contact angle of the film shown in Table 2 (SAM-1 to SAM-11) was measured again after each film was ultrasonically cleaned for one hour in water and toluene, the measured values were substantially the same as those prior to the ultrasonic cleaning and no significant changes were observed. Also, when the contact angle of the films of Comparative Examples 1 and 2 with respect to water toluene, and IPA (water, toluene, IPA) was measured after these films were subjected to an ultrasonic cleaning in toluene solvent for one hour, lowering of (41, 14, 15) and (45, 21, 18) were observed in Comparative Examples 1 and 2, respectively.

From the above, it becomes apparent that the films prepared in Examples had excellent contact to the substrate by being bonded by siloxane bonding whereas the films of Comparative Examples had inferior contact to the substrate and the bonding thereof was insufficient.

Example 2

(1) Preparation of Partially Hydrolyzed Product from Metal Alkoxide-4

After dissolving 530 g of titanium tetraisopropoxide (A-1, a product of NIPPON SODA CO., LTD.) into 1960 g of toluene in a four neck flask being subjected to a nitrogen gas replacement, the solution was cooled to −15° C. in an ethanol/dry ice bath. Apart from this, 30.4 g of ion exchanged water (molar ratio of $H_2O/Ti$=0.9) was mixed with 274 g of isopropanol. This mixture was added dropwise into the above-mentioned four neck flask over 90 minutes to carry out hydrolysis. The temperature of the solution inside the flask was maintained to be −15 to −10° C. during the dropwise addition of the mixture. After the completion of the dropwise addition, the mixture was stirred for 30 minutes at −10° C. and the stirring was continued for one hour after the temperature was increased to a room temperature to obtain transparent liquid. Then, the solution was cooled to −80° C. in an ethanol/dry ice bath, and a mixed solution of 20.3 g of ion exchanged water (molar ratio of $H_2O/Ti$=0.6) and 183 g of isopropanol was added to the solution dropwise over 90 minutes. After the completion of the dropwise addition, the temperature of the solution was returned to room temperature over 3 hours. Then, the solution was refluxed for two hours at 90 to 100° C., and transparent solution (C-4) was obtained. The solid content concentration in the solution converted to titanium oxide was 5% by weight. Also, the average particle size of the sol was 5.6 nm and had a monodispersity of sharp particle size distribution.

(2) Preparation of Partially Hydrolyzed Product from Metal Alkoxide-5

The above-mentioned solution C-4 was diluted with dehydrated toluene, and dispersion liquid (C-5) having a concentration of 1% by weight converted to titanium oxide was obtained.

(3) Preparation of Partially Hydrolyzed Product from Metal Alkoxide-6

Dispersion liquid (C-6) having a concentration of 1% by weight converted to titanium oxide in which hydrolyzed product of alkoxy titanium (A-10, a product of NIPPON SODA CO., LTD.) was dispersed in dehydrated toluene was obtained.

(4) Preparation of Partially Hydrolyzed Product from Metal Alkoxide-7

First, 17.79 g (62.6 mmol) of titanium tetraisopropoxide (A-1, a product of NIPPON SODA CO., LTD.: purity of 99%, concentration converted to titanium oxide of 28% by weight) was mixed with 65.31 g of dehydrated toluene in a flask with stirring under nitrogen gas atmosphere (temperature of the solution was 18° C.). Then, a mixture of 1.69 g of water (93.9 mmol), 30.42 g of dehydrated isopropanol, and 30.42 g of dehydrated toluene (concentration of water was 22% of the saturated solubility of water with respect to a mixed solvent of isopropanol and toluene) at a temperature of 18 to 20° C. was added dropwise to the mixture while being stirred over two hours to obtain isopropanol-toluene solution including hydrolyzed product of titanium isopropoxide having light yellowish transparent appearance. The amount of water added was H₂O/Ti=1.5 by molar ratio. When the solution was further stirred for 1.5 hours at a liquid temperature of 18° C., the color of the liquid became yellowish, and then became transparent after 2.5 hours of a refluxing process. The oxide concentration of the solution was 3.4% by weight. Toluene was added to the solution so that the oxide concentration was adjusted to be 1.0% by weight, and solution (C-7) was obtained.

(5) Preparation of Metal Oxide-8

Silica sol (IPA-ST-S, 25% by weight, a product of Nissan Chemical Industries, Ltd.) which was dispersed in IPA, was dispersed in dehydrated toluene, and dispersed solution (C-8) having a concentration of 1% by weight converted to silicon oxide was obtained. Note that the sol dispersibility of this solution was completely lost and became agglomerated. Thus, although it may be separated by filtration, the solution was redispersed and used for the case where it was aggregated.

(6) Preparation of Solution for Forming Chemical Adsorption Film-2

Organic solvents (toluene (Tol) and xylene (Xyl)) having a predetermined amount of water content shown in Table 3 were prepared using a Karl Fischer trace moisture meter. For the case where water was dispersed in solvent, water was sufficiently dispersed using a homogenizer. After metallic based surfactant (M-1 to M-4) shown below was added to the above-mentioned organic solvent, the mixture was stirred for 30 minutes at room temperature. Then, after a partially hydrolyzed product from a metal alkoxide, or a metal oxide (C-1 to C-8) was added dropwise in a mixing ratio shown in Table 3, the mixture was stirred for three hours. After this, the solution obtained was filtered, and solutions for preparing chemical adsorption film (SA-9 to SA-19) were obtained. The concentration of the metal based surfactant was 0.5% by weight in all of the solutions.

M-1: heptadecatrifluorodecyl trimethoxy silane (FAS-17), a product of Shin-Etsu Chemical Co. Ltd.
M-2: tridecafluorooctyl trimethoxy silane (FAS-13), a product of Gelest Co.
M-3: n-octadecyl trimethoxy silane (ODS), a product of Gelest Co.
M-4: decyl trimethoxy silane (DES), a product of Shin-Etsu Chemical Co. Ltd.

(7) Analysis of Solutions for Preparing Chemical Adsorption Film

Analysis of each of the solutions with respect to Si and Ti contained therein was carried out using ICP-AES. Results are shown in Table 3.

TABLE 3

| Solution for chemical adsorption film | Metal based surfactant (M) | Organic solvent | Amount of water in organic solvent (ppm) | Partially hydrolyzed product from metal alkoxide or metal oxide (C) | Mixing ratio of M and C (X)*1 | Metal concentration in solution (ppm) | | Si concentration prior to treated with (C) (ppm) |
|---|---|---|---|---|---|---|---|---|
| | | | | | | Si | Ti | |
| SA-9 | M-1 | Tol | 380 | C-5 | 90:10 | 218 | ND | 246 |
| SA-10 | M-1 | Tol | 550 | C-6 | 85:15 | 206 | ND | 246 |
| SA-11 | M-1 | Tol | 540 | C-8 | 60:40 | 246 | ND | 246 |
| SA-12 | M-2 | Tol | 380 | C-5 | 90:10 | 285 | ND | 300 |
| SA-13 | M-2 | Xyl | 350 | C-7 | 80:20 | 296 | ND | 300 |
| SA-14 | M-3 | Tol | 1050 | C-5 | 90:10 | 370 | 58 | 375 |
| SA-15 | M-3 | Tol | 850 | C-7 | 99:1 | 373 | 3.8 | 375 |
| SA-16 | M-3 | Xyl | 560 | C-6 | 90:10 | 372 | 60 | 375 |
| SA-17 | M-3 | Tol | 880 | C-8 | 70:30 | 370 | ND | 375 |
| SA-18 | M-4 | Tol | 1020 | C-5 | 90:10 | 520 | 85 | 535 |
| SA-19 | M-4 | Tol | 950 | C-8 | 60:40 | 535 | ND | 535 |

*1X: (mole number of M: mole number of metal components in solution C converted to metal oxide)
ND: not detected From the results shown in Table 3, it becomes apparent that almost all partially hydrolyzed product from a metal alkoxide or metal oxide contained in the solution for preparing a chemical adsorption film can be removed by carrying out only a filtration process when the raw material was M-1 and M-2, or the catalyst was C-7. For the case where the raw material was M-3 and M-4 and the catalyst was other than C-7, no precipitates were observed in the solution when all processes were performed. When water of large excess was added to these solutions, no precipitation was observed.

Also, when SA-15 solution was condensed and analyzed using $^{29}$Si-NMR, peaks corresponding to M-3 were mainly observed, and it was found that M-3 which was not hydrolyzed was mainly present in the solution for chemical adsorption film.

(8) Formation of Chemical Adsorption Film

Soda lime glass substrates (SLG), silicon wafers (Si), and no-alkali glasses (OA-10), which were subjected to an ultrasonic cleaning process and an ozone cleaning process, were immersed into the above solutions for preparing chemical adsorption film (SA-9 to SA-19) for predetermined periods of time shown in Table 4, and then washed with toluene, and dried at 60° C. for 10 minutes to form chemical adsorption film (SAM-12 to SAM-25).

(8) Evaluation of Chemical Adsorption Film

<Measurement of contact angle> and <Analysis of composition of film> were carried out in the same manner as in Example 1.

As for <Adhesion of film>, the chemical adsorption films prepared as explained above were subjected to ultrasonic cleaning for one hour in water and toluene and the contact angle of each was measured again. The obtained values before and after the ultrasonic cleaning were compared, and those which showed substantially no change were indicated by ◯, and those which showed lowering of contact angle were indicated by x.

Results of the above are tabulated in Table 4.

TABLE 4

| Solution for forming film | Substrate | Immerse time (min) | Contact angle of film | | | Adhesion of film ultrasonic cleaning |
|---|---|---|---|---|---|---|
| | | | Water | Tol | IPA | |
| SAM-12 | SA-9 | SLG | 3 | 108 | 62 | 36 | ○ |
| SAM-13 | SA-9 | Si | 10 | 103 | 58 | 35 | ○ |
| SAM-14 | SA-9 | OA-10 | 5 | 107 | 60 | 34 | ○ |
| SAM-15 | SA-10 | SLG | 5 | 108 | 56 | 37 | ○ |
| SAM-16 | SA-11 | OA-10 | 5 | 105 | 62 | 42 | ○ |
| SAM-17 | SA-12 | SLG | 5 | 103 | 55 | 32 | ○ |
| SAM-18 | SA-13 | OA-10 | 5 | 102 | 53 | 32 | ○ |
| SAM-19 | SA-14 | SLG | 1 | 112 | 34 | 17 | ○ |
| SAM-20 | SA-14 | OA-10 | 10 | 108 | 32 | 15 | ○ |
| SAM-21 | SA-15 | SLG | 5 | 103 | 31 | 14 | ○ |
| SAM-22 | SA-16 | SLG | 5 | 103 | 31 | 15 | ○ |
| SAM-23 | SA-17 | OA-10 | 10 | 107 | 36 | 18 | ○ |
| SAM-24 | SA-18 | SLG | 5 | 98 | 22 | 12 | ○ |
| SAM-25 | SA-19 | OA-10 | 5 | 99 | 22 | 13 | ○ |

As shown in Table 4, it becomes obvious that a chemical adsorption film of various compounds may be rapidly formed on various substrates with immersion time of 10 minutes or less according to the present invention. Also, water/oil repellent and contact of the film were excellent. Moreover, no metal components used for catalyst was detected by the composition analysis of the film using an XPS, and since the substrate information was detected at the same time, it was found that the film was substantially a monomolecular film having a thickness of 10 nanometer or less.

INDUSTRIAL APPLICABILITY

As explained above, it becomes possible to form a self-assembled monomolecular film of a dense structure having few impurities by using a method of the present invention. The monomolecular film may be used in forming a design pattern of electronic devices, etc., and may be readily applied to electronics products, in particular, domestic electrical products, vehicles, industrial appliances, mirrors, eyeglass lenses, etc., which require ultrathin film coating having heat-resistance, weather resistance, and abrasion resistance. Accordingly, the industrial applicability of the invention is good.

The invention claimed is:

1. A method for preparing a chemical adsorption film on a surface of a substrate containing active hydrogen, comprising the steps of:
   treating a metal based surfactant having at least one hydrolyzable group with a metal oxide or a partially hydrolyzed product of at least one metal alkoxide and water in an organic solvent to form a solution, and
   contacting the solution with the surface of the substrate, wherein said metal alkoxide is selected from the group consisting of titanium alkoxide, zirconium alkoxide, aluminum alkoxide, germanium alkoxide, indium alkoxide, tin alkoxide, tantalum alkoxide, tungsten alkoxide, zinc alkoxide and lead alkoxide, and
   wherein when a partially hydrolyzed product of a metal alkoxide is used, the amount of the partially hydrolyzed product is 0.001 to 1 mol per mol of the metal based surfactant.

2. A method for preparing a chemical adsorption film on a surface of a substrate containing active hydrogen, comprising the steps of:
   treating a metal based surfactant having at least one hydrolyzable group with a metal oxide or a partially hydrolyzed product of at least one metal alkoxide and water in an organic solvent to form a solution;
   removing the metal oxide or the partially hydrolyzed product of a metal alkoxide from the solution, and
   contacting the solution with the surface of the substrate, wherein said metal alkoxide is selected from the group consisting of titanium alkoxide, zirconium alkoxide, aluminum alkoxide, germanium alkoxide, indium alkoxide, tin alkoxide, tantalum alkoxide, tungsten alkoxide, zinc alkoxide and lead alkoxide, and
   wherein when a partially hydrolyzed product of a metal alkoxide is used, the amount of the partially hydrolyzed product is 0.001 to 1 mol per mol of the metal based surfactant.

3. A method for preparing a chemical adsorption film according to claim 1 or 2, wherein an amount of the metal oxide used is a catalytic amount with respect to the metal based surfactant.

4. A method for preparing a chemical adsorption film according to claim 1 or 2, wherein the chemical adsorption film is a chemical adsorption film which is covalently bonded to the surface of the substrate via metal-oxygen bonding.

5. A method for preparing a chemical adsorption film according to claim 1 or 2, wherein the chemical adsorption film is a monomolecular film.

6. A method for preparing a chemical adsorption film according to claim 1 or 2, wherein the organic solvent is a hydrocarbon solvent or a fluorocarbon solvent.

7. A method for preparing a chemical adsorption film according to claim 1 or 2, wherein the partially hydrolyzed product has the property of being stably dispersed without being agglomerated in the organic solvent in the absence of acid, base, and/or dispersion stabilizer.

8. A method for preparing a chemical adsorption film according to claim 1 or 2, wherein the partially hydrolyzed product is a product obtained by hydrolysis using 0.5 to less than 2.0 times water on a molar basis with respect to the metal alkoxide in an organic solvent in the absence of acid, base, and/or dispersion stabilizer at a temperature range of $-100°$ C. to the reflux temperature of the organic solvent.

9. A method for preparing a chemical adsorption film according to claim 1 or 2, wherein the metal based surfactant having at least one hydrolyzable group is a compound expressed by the following formula (I):

$$R^1{}_n MX_{m-n} \cdots \qquad (I)$$

wherein $R^1$ represents a monovalent hydrocarbon group, a monovalent halogenated hydrocarbon group, a monovalent hydrocarbon group having a coupling group, or a monovalent halogenated hydrocarbon group having a coupling group; M represents at least one kind of metal atom selected from the group consisting of silicon atom, germanium atom, tin atom, titanium atom, and zirconium atom; X represents a hydrolyzable group; n represents an integer from 1 to (m−1), and m represents a valence of M, and when n is 2 or greater, each occurrence of $R^1$ may be the same or different and when (m−2) is 2 or greater, each occurrence of X may be the same or different.

10. A method for preparing a chemical adsorption film according to claim 9, wherein the compound expressed by the formula (I) is a compound expressed by the following formula (II):

$$CF_3-(CF_2)_p-R^2{}_q-MY_r X_{m-r} \cdots \qquad (II)$$

wherein $R^2$ represents an alkylene group, a vinylene group, an ethynylene group, an arylene group, or a divalent functional group including a silicon atom and/or oxygen atom; Y represents a hydrogen atom, an alkyl group, an alkoxy group, an alkyl group including fluorine, or an alkoxy group including fluorine; each of X, M, and m are the same as in claim 10; p represents 0 or any integer; q represents 0 or 1, and r represents 0 or an integer of from 1 to (m−1), and when r is 2 or greater, Y may be the same or different, and when m−r is 2 or greater, each occurrence of X may be the same or different.

11. A method for preparing a chemical adsorption film according to claim 1 or 2, wherein the substrate is at least one selected from metal, ceramic, glass, plastic, paper, fiber, and leather.

12. A method for preparing a chemical adsorption film according to claim 1 or 2, wherein the step of treating a metal based surfactant having at least one hydrolyzable group with the metal oxide or the partially hydrolyzed product of a metal alkoxide and water in the organic solvent, is a hydrolysis process.

* * * * *